United States Patent
Zhang

(10) Patent No.: US 10,670,904 B2
(45) Date of Patent: Jun. 2, 2020

(54) DISPLAY MODULE

(71) Applicant: Wuhan China Star Optoelectronics Technology Co., Ltd., Wuhan, Hubei (CN)

(72) Inventor: Wei Zhang, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 114 days.

(21) Appl. No.: 15/328,389

(22) PCT Filed: Dec. 27, 2016

(86) PCT No.: PCT/CN2016/112272
§ 371 (c)(1),
(2) Date: Jan. 23, 2017

(87) PCT Pub. No.: WO2018/112998
PCT Pub. Date: Jun. 28, 2018

(65) Prior Publication Data
US 2018/0292703 A1 Oct. 11, 2018

(51) Int. Cl.
| | | |
|---|---|---|
| *G02F 1/1335* | (2006.01) | |
| *F21V 8/00* | (2006.01) | |
| *G02F 1/1333* | (2006.01) | |
| *G02F 1/13357* | (2006.01) | |

(52) U.S. Cl.
CPC ..... *G02F 1/133512* (2013.01); *G02B 6/0055* (2013.01); *G02F 1/13338* (2013.01);
(Continued)

(58) Field of Classification Search
CPC ......... G02F 1/133512; G02F 1/133308; G02F 1/13338; G02F 1/133385; G02F 1/133528;
(Continued)

(56) References Cited

U.S. PATENT DOCUMENTS

| | | | |
|---|---|---|---|
| 8,643,806 B2 * | 2/2014 | Yoo | G02F 1/133605 349/62 |
| 2012/0057111 A1 * | 3/2012 | Ohkubo | G02F 1/1339 349/106 |

(Continued)

FOREIGN PATENT DOCUMENTS

| | | |
|---|---|---|
| CN | 102054398 A | 5/2011 |
| CN | 102608779 A | 7/2012 |
| CN | 202532330 U | 11/2012 |
| CN | 203587921 U | 5/2014 |
| CN | 104566023 A | 4/2015 |
| CN | 104879685 A | 9/2015 |

(Continued)

*Primary Examiner* — Cara E Rakowski
*Assistant Examiner* — Jessica M Apenteng
(74) *Attorney, Agent, or Firm* — Andrew C. Cheng

(57) ABSTRACT

The present invention relates to a technology of liquid crystal display, and more particularly, to publish a display module, which comprises a middle frame; and a panel cartridge is recessed in the middle frame for accommodating a panel module; a component cartridge is arranged relatively under the panel cartridge and is recessed in the middle frame for accommodating a backlight module; the display module further comprises a light shielding component which is arranged between the panel module and the middle frame for preventing light entering the panel module from the side of the panel module. The invention can prevent the light from entering the panel module from the side wall of the panel module by introducing a light shielding component, the problem of white spot in view area can be solved and the visual effect of the display can be improved.

11 Claims, 2 Drawing Sheets

(52) U.S. Cl.
CPC .. *G02F 1/133308* (2013.01); *G02F 1/133385* (2013.01); *G02F 1/133528* (2013.01); *G02B 6/0013* (2013.01); *G02B 6/0023* (2013.01); *G02F 2001/133317* (2013.01); *G02F 2001/133628* (2013.01); *G02F 2201/08* (2013.01); *G02F 2202/28* (2013.01)

(58) Field of Classification Search
CPC ..... G02F 2001/133317; G02F 2202/28; G02F 2001/133628; G02F 2201/08; G02B 6/0055; G02B 6/0013; G02B 6/0023
USPC .......................................................... 362/606
See application file for complete search history.

(56) References Cited

U.S. PATENT DOCUMENTS

| | | | |
|---|---|---|---|
| 2012/0162565 | A1 | 6/2012 | Lee |
| 2015/0301266 | A1* | 10/2015 | Araki ................ G02B 6/005 349/65 |
| 2016/0077275 | A1* | 3/2016 | Lv ................ G02F 1/133308 349/58 |
| 2016/0085021 | A1* | 3/2016 | Cao ................ G02B 6/0088 362/606 |
| 2016/0085109 | A1* | 3/2016 | Baek ................ G02F 1/133308 362/607 |
| 2016/0187559 | A1* | 6/2016 | Li ................ G02B 6/0021 362/609 |
| 2017/0031202 | A1* | 2/2017 | Lee ................ B32B 7/14 |

FOREIGN PATENT DOCUMENTS

| | | |
|---|---|---|
| CN | 205049841 U | 2/2016 |
| CN | 102495499 A | 6/2016 |

* cited by examiner

DISPLAY MODULE

FIELD OF THE INVENTION

The present invention relates to a technology of liquid crystal display, and more particularly, to a structural improvement of display module.

DESCRIPTION OF PRIOR ART

Touch panels are used increasingly in a variety of mobile phones a variety of mobile phones, tablet computers, and other electronic devices, and rich people's lives, requirements of display quality of touch panel are also increasing.

Currently, when the touch panel module (TPM) components arranged in middle frame of electronic equipment, there will be some light leakage phenomenon. The bad performance is: there are bright white spots on the both sides of view area when viewing from the side of the electronic device, which affects the black visual effect.

As shown in FIG. 1, the exist electronic device comprises a middle frame 210, and a backlight module 230 and a panel module 220 are arranged in the middle frame 210. Wherein the backlight module 230 comprises a plastic frame 231, a light guide plate 232 is arranged relatively in the plastic frame 231, an optical film group 233 and a reflective plate 234 are arranged relatively in the upper surface and the lower surface of the light guide plate 232, respectively, and the optical film group 233 and the reflective plate 234 are connected to the plastic frame 231. A light source 235 is arranged between one side of the light guide 232 and the plastic frame 231.

In general, light is emitted from the light source 235, most of the light enters the light guide plate 232 and is reflected by the reflective plate 234, and the light is emitted from the upper surface of the light guide plate 232 into the optical film group 233 and then enters the panel module 220 to be processed to be emitted into the human eye. However, a part of the light is easy to "leak out" from the side 230B of the backlight module 230, or the side 220A of the panel module 220, or between them. For example, the plastic frame 231 and the reflective plate 234 are connected by a twin adhesive 236, and its adhesion is poor so that the light is emitted from between the plastic frame 231 and the reflective plate 234 into the inner side wall of the middle frame 210. For another example, the light blocking function of the plastic frame 231 itself is limited, a part of the light is emitted from the plastic frame 231 itself into the inner side wall of the middle frame 210. For further another example, the plastic frame 231 and the panel module 220 are connected to each other by a light shielding bar 237, there is also the problem of poor adhesion so that when the light is emitted from the optical film group 233, a small part of the light is also emitted from between the plastic frame 231 and the panel module 220 into the inner side wall of the middle frame 210. In addition, the existence of light leakage phenomenon can also be confirmed by data statistics. For example, the average brightness of the backlight module is 11500 nit, the average brightness of the light transmitted from the plastic frame and the twin adhesive is 690 nit, and the average brightness of the light transmitted from the reflective plate is 120 nit. There are other reasons or regions for the existence of "light leakage" of problem, it cannot be exhaustive here.

When light which is "leaked out" from the backlight module 230 and the panel module 220 reaches the inner side wall of the middle frame 210, a part of the light is reflected 210 to the side 220A of the panel module 220 by the middle frame, and through the side 220A of the panel module, then the light is emitted through the touch panel 25. Display screen of the entire display module 200 is divided into an active area, a view area, and a black box area surrounding the active area. Now, light is emitted from the side 220A of the panel module into view area, when the image color is switched to black, white spots will be seen, and the visual effect is affected.

People would like to find a way to overcome these visual problems described above.

SUMMARY OF THE INVENTION

In order to solve deficiencies of prior art, the present invention provides a display module, which comprises a middle frame, and a panel cartridge is recessed in the middle frame for accommodating a panel module;

a component cartridge is arranged relatively under the panel cartridge and is recessed in the middle frame for accommodating a backlight module;

the display module further comprises a light shielding component which is arranged between the panel module and the middle frame for preventing light entering the panel module from the side of the panel module.

Wherein the light shielding component extends downwardly to the inside of the component cartridge and is arranged between the backlight module and the middle frame.

Wherein the light shielding component extends downwardly to the bottom of the component cartridge.

Wherein the light shielding component is a black dispensing.

Wherein the light shielding component is a black heat radiating plate.

Wherein the backlight module comprises a plastic frame and a light guide plate arranged relatively in the plastic frame, an optical film group and a reflective plate are arranged respectively corresponding to the upper surface and the lower surface of the light guide plate, a light source is arranged between one side of the light guide plate and the plastic frame.

Wherein the panel module comprises a lower polarizing plate, a cover plate, an upper polarizing plate, an optical adhesive, and a touch panel which are stacked from bottom to top.

The Benefits:

The display module provided by the present invention, adds a light shielding component made from black material between in the middle frame and the panel module and/or between in the middle frame and the backlight module. By using light shielding component to cover light and black material with function of absorbing light, the light leakage phenomenon is effectively solved, and the chance of white spot causing is reduced when light is emitted into the side of panel module because of reflection. If the light shielding component material is made from a cooling material, it can also have the effect of rapid cooling.

BRIEF DESCRIPTION OF DRAWINGS

Technical implementation will be described below clearly and fully by combining with drawings made in accordance with an embodiment in the present invention.

DESCRIPTION OF PREFERRED EMBODIMENT

Detailed description will be given by following description in order to fully understand the present invention. However, the present invention can be implemented in different from many other ways which described herein. Technical staff in this field can extend similarly without departing from the intention of the present invention. Therefore, the present invention is not limited to the particular embodiment disclosed below.

The First Embodiment

Figure 1:
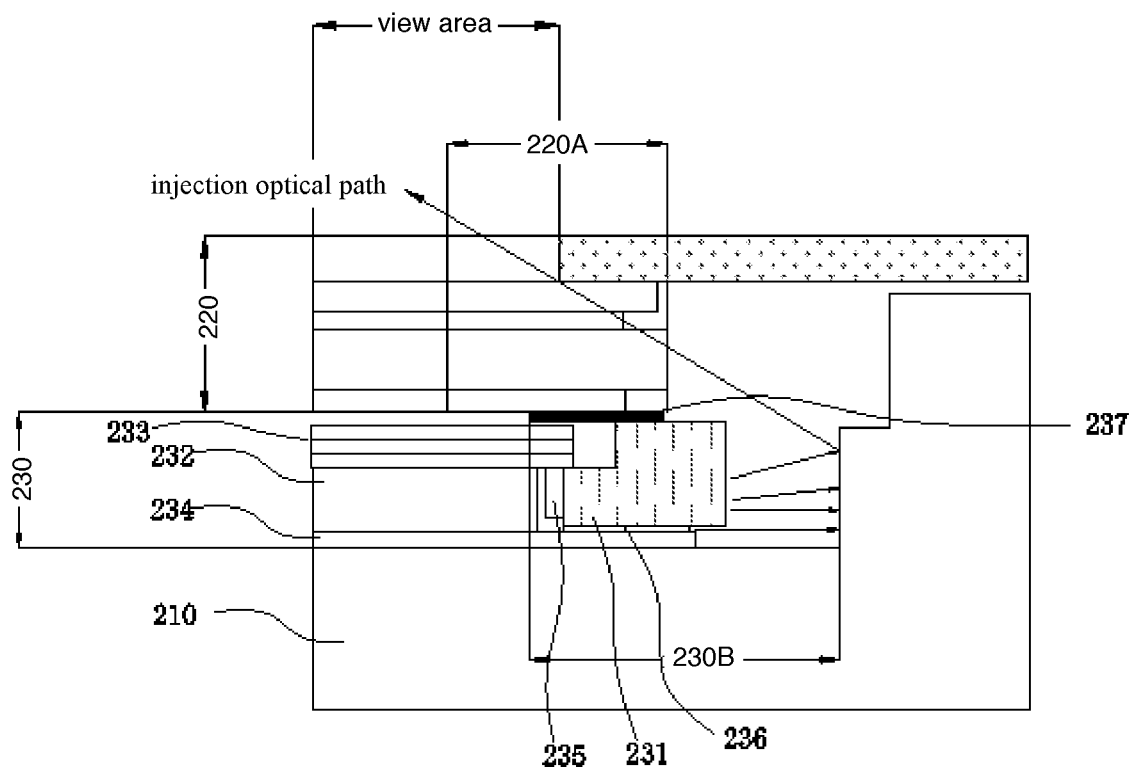
FIG. 1 is a structural illustration of an embodiment made in accordance to a display module of prior art.
Figure 2:
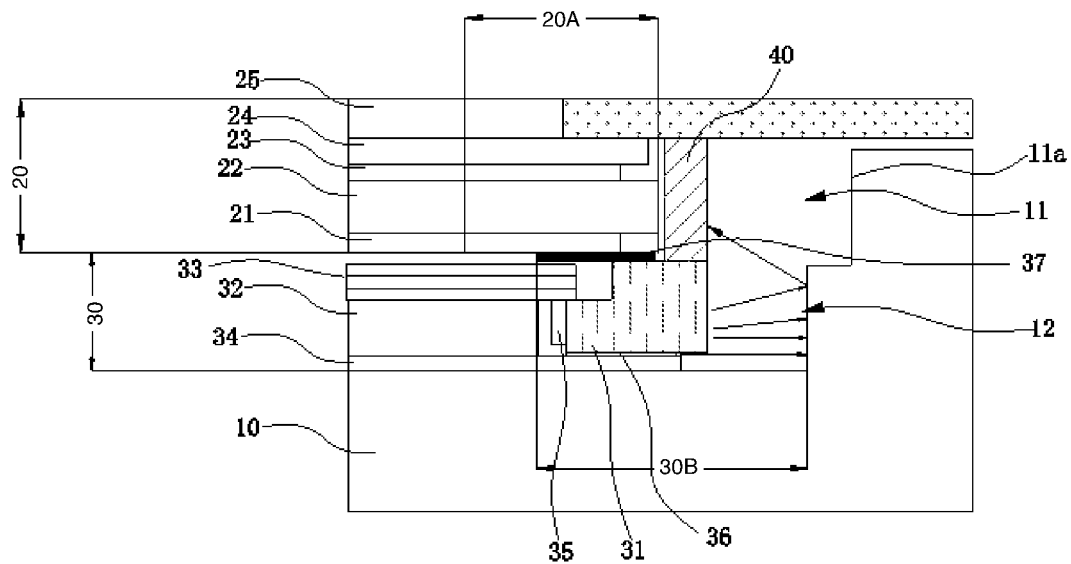
FIG. 2 is a structural illustration of the first embodiment made in accordance to a display module of the present invention.

The present invention provides a display module, as shown in FIG. 2, which comprises a middle frame 10, and a panel cartridge 20, a backlight module 30, and light shielding component 40 are arranged in the middle frame 10.

Wherein a panel cartridge 11 and a component cartridge 12 with an upper opening are recessed in the middle frame 10, and a component cartridge 12 is arranged relatively under the panel cartridge 11.

The panel module 20 and the backlight module 30 are accommodated in the panel cartridge 11 and the module cartridge 12, respectively, so that the panel module 20 and the backlight module 30 are stacked vertically.

As shown in FIG. 2, the panel module 20 of the present embodiment comprises a lower polarizing plate 21, a glass cover plate 22, an upper polarizing plate 23, an optical adhesive 24, and a touch panel 25 which are stacked from bottom to top.

The backlight module 30 comprises a plastic frame 31 and a light guide plate 32 arranged relatively in the plastic frame 31, an optical film group 33 and a reflective plate 34 are arranged respectively corresponding to the upper surface and the lower surface of the light guide plate 32, a light source 35 is arranged between one side of the light guide plate 32 and the plastic frame 31. The reflective plate 34 and the optical film group 33 are fixed on the plastic frame 31 by a light shielded twin adhesive 36. The plastic frame 31 and the panel module 20 are fixedly connected by a light shielding bar 37.

The light shielding component 40 is arranged between the panel module 20 and the middle frame 10. Specifically, the light shielding component 40 of the present embodiment is arranged between the panel module 20 and a side wall 11a of the panel cartridge, which is used for shielding or absorbing the light emitted from the backlight module 30 and reflected into the panel module 20 through the middle frame 10.

Preferably, the light shielding component 40 of the present embodiment may be arranged close side 20A of the panel module 20, it can prevent the reflected light from the middle frame more effectively. The light shielding component 40 may be made from black dispensing or may be a black heat radiating plate. The light reflected from the middle frame 10 can be absorbed by the black dispensing or heat radiating plate to prevent the light from entering the side 20A of the panel module 20, thereby the problem of white spot in view area can be solved. The light shielding component made from a heat radiating plate material can also be used to facilitate to solve the problem of cooling in the panel module 20.

The Second Embodiment

Figure 3:
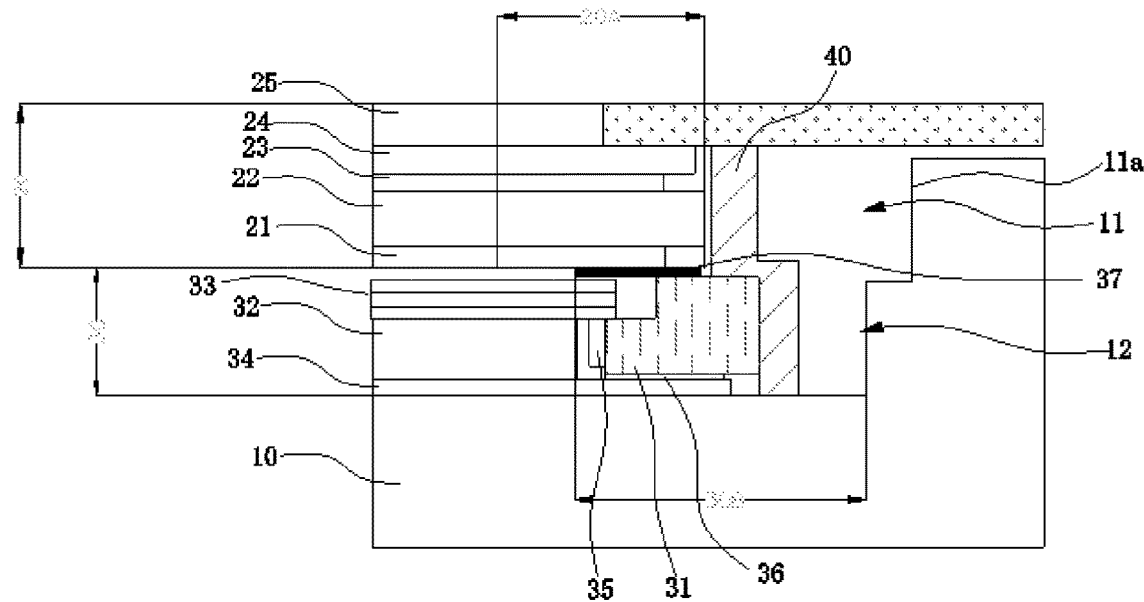
FIG. 3 is a structural illustration of the second embodiment made in accordance to a display module of the present invention.

This embodiment is different from the first embodiment in that, as shown in FIG. 3, the light shielding component 40 extends downwardly to the component cartridge 12 and is arranged between the backlight module 30 and the middle frame 10. Specifically, the light shielding component 40 is arranged between the backlight module 30 and the side wall 12a of the component cartridge 12. The light shielding component 40 is arranged close to the backlight module 30 and is attached to the outside of the plastic frame 31, it is advantageous to prevent the light emitted from the backlight module 30.

Similarly, the light shielding component 40 may be made from black dispensing or may be a black heat radiating plate. The light reflected from the backlight module 30 can be absorbed by the black dispensing or heat radiating plate to prevent the light from reaching the middle frame 10 and then reflected, thereby the problem of white spot in view area can be solved. The light shielding component made from a heat radiating plate material can also be used to facilitate to solve the problem of cooling in the backlight module 30.

The Third Embodiment

Figure 4:
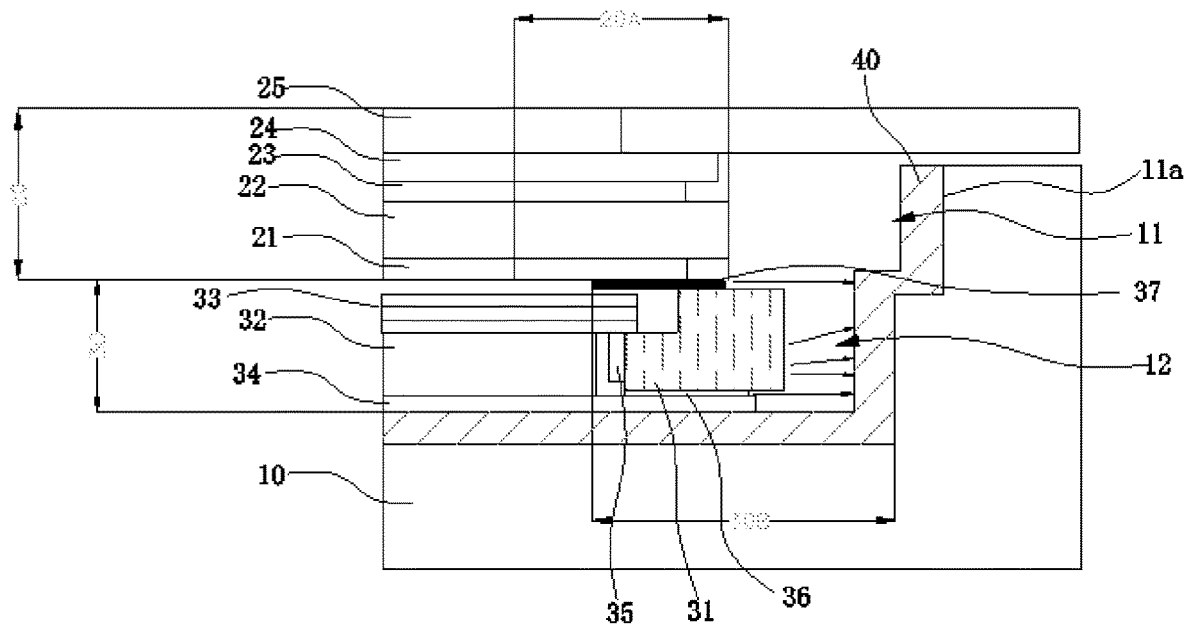
FIG. 4 is a structural illustration of the third embodiment made in accordance to a display module of the present invention.

The present embodiment is a further optimization of the second embodiment, the light shielding component 40 can further extend downwardly to the bottom of the component cartridge, as shown in FIG. 4, the entire component cartridge 12 and the inner wall of the panel cartridge 11, are covered with the light shielding component 40, i.e., in the middle frame 10, the area of the panel module and the backlight module is accommodated to form a black background. The black background can be used to absorb the light emitted from the panel module and the backlight module.

The light shielding component 40 may be made from black dispensing or may be a black heat radiating plate. The light emitted from the backlight module 30, or the panel module 20, or between them is absorbed by the black dispensing or the heat radiating plate, and prevent the light from reflecting and then enters from the side of the panel module, the problem of white spot in view area can also be solved.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A display module comprising a middle frame having a side wall, a panel cartridge recessed in the middle frame and defined by the side wall for accommodating a panel module that comprises a lower polarizing plate, a glass cover plate, and an upper polarizing plate sequentially stacked on each other to form a first stack that has a lateral side facing the side wall of the middle frame, and a component cartridge arranged under the panel cartridge and recessed in the middle frame for accommodating a backlight module that comprises a light guide plate and an optic film group stacked on an upper surface of the light guide plate to form a second stack that has a lateral side facing the side wall of the middle frame, wherein the display module further comprises a light shielding component arranged between the panel module and the middle frame for preventing light entering the panel module from the side of the panel module, wherein the light shielding component has at least a part that is located above the light guide plate of the backlight module and between the lateral side of the first stack of the panel module and the side wall of the middle frame such that the at least a part of the light shielding component has a side facing the lateral side of the first stack of the panel module and the lateral side of the first stack of the panel module and the side wall of the middle frame are isolated from each other by the at least a part of the light shielding component to prevent light reflected from the middle frame from transmitting through the lateral side of the first stack to get into the panel module.

2. The display module as recited in claim 1, wherein the light shielding component extends downwardly to the inside of the component cartridge and is arranged between the lateral side of the second stack of the backlight module and the side wall of the middle frame.

3. The display module as recited in claim 2, wherein the light shielding component extends downwardly to the bottom of the component cartridge.

4. The display module as recited in claim 3, wherein the light shielding component is a black dispensing.

5. The display module as recited in claim 3, wherein the light shielding component is a black heat radiating plate.

6. The display module as recited in claim 2, wherein the light shielding component is a black dispensing.

7. The display module as recited in claim 2, wherein the light shielding component is a black heat radiating plate.

8. The display module as recited in claim 1, wherein the light shielding component is a black dispensing.

9. The display module as recited in claim 1, wherein the light shielding component is a black heat radiating plate.

10. The display module as recited in claim 1, wherein the backlight module comprises a plastic frame in which the light guide plate is arranged, a reflective plate arranged on a lower surface of the light guide plate, and a light source arranged between one side of the light guide plate and the plastic frame.

11. The display module as recited in claim 1, wherein the panel module further comprises an optical adhesive layer stacked on the upper polarizing plate, and a touch panel stacked on the optical adhesive layer.

* * * * *